(12) United States Patent
Sim

(10) Patent No.: US 9,458,874 B2
(45) Date of Patent: Oct. 4, 2016

(54) CONNECTOR SYSTEM FOR STRUCTURAL FRAMEWORK

(75) Inventor: Boon Keng Sim, Singapore (SG)

(73) Assignee: BOTAK SIGN PTE LTD, Singapore (SG)

( * ) Notice: Subject to any disclaimer, the term of this patent is extended or adjusted under 35 U.S.C. 154(b) by 186 days.

(21) Appl. No.: 14/233,145

(22) PCT Filed: Jun. 29, 2012

(86) PCT No.: PCT/SG2012/000235
§ 371 (c)(1),
(2), (4) Date: Mar. 24, 2014

(87) PCT Pub. No.: WO2013/055292
PCT Pub. Date: Apr. 18, 2013

(65) Prior Publication Data
US 2014/0241794 A1    Aug. 28, 2014

(30) Foreign Application Priority Data

Oct. 10, 2011    (SG) ................. 201107556-1

(51) Int. Cl.
*F16B 7/04*    (2006.01)
*E04B 1/19*    (2006.01)
(Continued)

(52) U.S. Cl.
CPC ............ *F16B 7/20* (2013.01); *A47B 47/0016* (2013.01); *E04B 1/5831* (2013.01); *F16B 7/044* (2013.01);
(Continued)

(58) Field of Classification Search
CPC ............ A47B 47/0016; E04B 1/1903; E04B 1/1906; E04B 1/1912; E04B 1/5831; E04B 2001/1957; E04B 2001/2406; E04B 2001/2676; E04B 2001/3247; E04B 2001/5881; F16B 7/044; F16B 7/048; F16B 7/185; F16B 2012/443; F16B 2012/446; Y10T 403/34–403/35; Y10T 403/42; Y10T 403/44; Y10T 403/443; Y10T 403/7005; Y10T 403/7007; Y10T 403/7009; Y10T 403/7015; Y10T 403/7096
USPC ............. 52/655.1, 655.2; 403/169–178, 205, 403/217, 218, 348–350, 353, 382, 403; 446/108
See application file for complete search history.

(56) References Cited

U.S. PATENT DOCUMENTS 3,982,841 A    9/1976  Endzweig
4,527,760 A *  7/1985  Salacuse ................. A47K 1/09
                                            24/DIG. 53

(Continued)

FOREIGN PATENT DOCUMENTS

FR    2631660 A2    11/1989
WO    8504220 A1    9/1985

*Primary Examiner* — Josh Skroupa
(74) *Attorney, Agent, or Firm* — Hultquist, PLLC; Steven J. Hultquist

(57) ABSTRACT

A connector system of a structural frame work for display structures. The system includes a socket device and a plug device that can be coupled to the socket device. The socket device includes an outer housing and a socket member in the socket housing, the socket member having a socket hole of non-circular cross-section disposed in a distance behind a coupling hole that is bordered by a retainer wall of the outer socket housing. The plug device includes a plug body and a coupling sleeve slidably and rotatably fitted onto the plug body that includes an exposed plug end portion axially projecting out of the coupling sleeve to fit into the socket hole of the socket member, the coupling sleeve including at least one radial locking nose projecting outwardly from the free end portion of the coupling sleeve that fits through the coupling hole of the socket housing.

20 Claims, 10 Drawing Sheets

(51) Int. Cl.
*E04B 1/58* (2006.01)
*F16B 7/20* (2006.01)
*A47B 47/00* (2006.01)
*F16B 12/44* (2006.01)

(52) U.S. Cl.
CPC ...... *E04B 1/1912* (2013.01); *E04B 2001/1957* (2013.01); *E04B 2001/5881* (2013.01); *F16B 2012/446* (2013.01); *Y10T 403/342* (2015.01); *Y10T 403/347* (2015.01); *Y10T 403/44* (2015.01); *Y10T 403/7005* (2015.01); *Y10T 403/7007* (2015.01)

(56) References Cited

U.S. PATENT DOCUMENTS

| | | | |
|---|---|---|---|
| 4,646,503 A | | 3/1987 | Brullmann et al. |
| 4,787,769 A | | 11/1988 | Micheal |
| 5,007,762 A | * | 4/1991 | Duran .................. E04B 1/1906 403/171 |
| 5,261,758 A | * | 11/1993 | Vranish ................ B23B 31/113 403/348 |
| 5,498,094 A | * | 3/1996 | Imai .................... E04B 1/1903 403/169 |
| 2012/0009013 A1 | * | 1/2012 | Evitt .................... E04B 1/5831 403/349 |

* cited by examiner

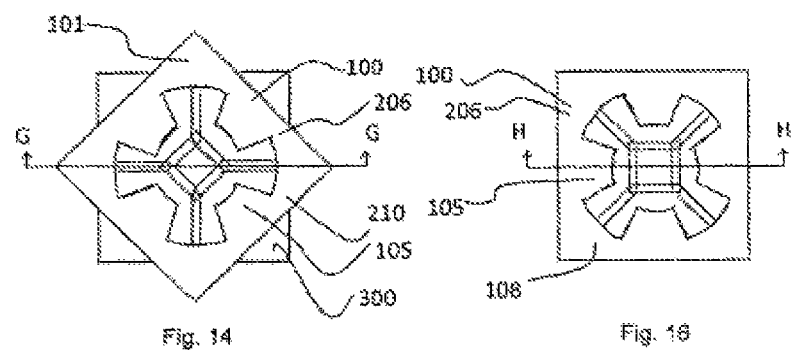
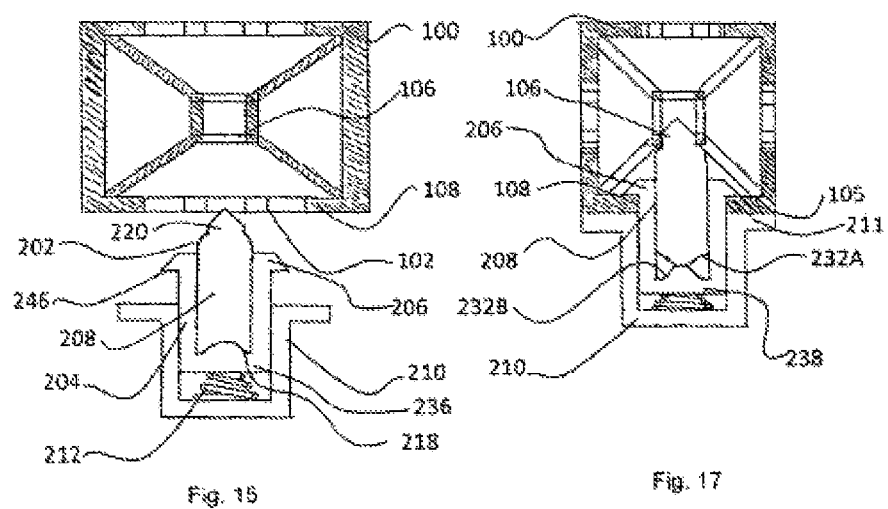

CONNECTOR SYSTEM FOR STRUCTURAL FRAMEWORK

CROSS-REFERENCE TO RELATED APPLICATIONS

This application is a U.S. national phase under the provisions of 35 U.S.C. §371 of International Patent Application No. PCT/SG12/00235 filed Jun. 29, 2012, which in turn claims priority of Singapore Patent Application No. 201107556-1 filed Oct. 10, 2011. The disclosures of such international patent application and Singapore priority patent application are hereby incorporated herein by reference in their respective entireties, for all purposes.

TECHNICAL FIELD

The present invention relates to a connector system of a structural framework, the structural framework preferably of a kind to be used for display structures or the like, the system comprising a socket device and a plug device that can be coupled to the socket device. The present invention is especially of advantage as a connector system of bar members by which the structural frame work is built.

BACKGROUND

Display structures are commonly used on a structural framework in make shift events like exhibitions and road shows for displaying items like posters and banners.

In the past, frameworks are constructed using conventional material like wood and methods like bolt and nuts and nails. These methods are labour intensive and time consuming. However, in recent years, there have been many innovations devised to reduce the time used to construct the frameworks and lighter materials have been used e.g. aluminium.

In U.S. Pat. No. 4,646,503 (Brullmann et. al.), a set of construction elements for erecting three-dimensional framework is disclosed. The elements include hollow structural members and assembly blocks. To assemble the structure, a projecting head at an end portion of a structural member is latched within an opening of an assembly block and secured by a movable locking wedge activated by a jackscrew placed transversely within the structural member. Although Brullmann may have reduced the time required to construct the structure and also the weight of the material, the invention of Brullmann still requires a considerable amount of time to assemble the structure due to the intricacy in tightening the screw to drive the wedge to secure the structure. In addition, Brullmann's structure may not be robust enough to withstand the hectic and demanding conditions found in make shift events as the jackscrews may be lost after numerous times of use and render the structure unsafe for use. Further, the use of tools to assemble and disassemble the structure is time-consuming when speed in setting up the display structure is crucial to save time and money at costly exhibition spaces.

Typically, the assembling and disassembling of the display structures require considerable amount of strength. However, in events like exhibitions and road shows, it would be beneficial if the structures can be easily assembled or disassembled so that an average person is able to do so without much assistant. As such, display structures like that of Brullmann which require certain amount of strength to assemble, e.g. tightening of countless number of screws, would be difficult to be assembled.

The present invention seeks to provide a connector system of a structural framework to construct display frameworks or other framework structures which is quick and easy to assemble and yet reliable.

SUMMARY

According to the present invention, a connector system of a structural framework and structure member including members of such connector system are provided.

The connector system basically comprises a socket device and a plug device that can be coupled to the socket device. The socket device includes an outer housing and a socket member in the socket housing, the socket member in the socket housing having a coupling hole bordered by a retainer wall. The socket member having a socket hole of non-circular cross-section, the socket hole disposed in a distance behind a coupling hole. The plug device comprises a plug member and a coupling sleeve, the plug member including a plug body that is cylindrical slidably inserted into the coupling sleeve and that includes an exposed plug end portion axially projecting out of a free end portion of the coupling sleeve and having a non-circular cross-section designed to fit into the socket hole of the socket member. The free end portion includes at least one radial locking nose radially projecting outwardly on an outer peripheral surface of the free end portion of the coupling sleeve and having a limited circumferential width preferably equal to or smaller than half of the circumferential length of the outer peripheral surface of the free end portion. The coupling sleeve is designed to axially be displaceable relative on the plug member between a release position and a coupling position. The free end portion of the coupling sleeve inclusive of the locking nose axially fits through the coupling hole of the socket housing when the coupling sleeve is in the release position, and the retainer wall includes a locking portion radially projecting by the radial projecting length of the locking nose into the coupling hole. The plug body and the coupling sleeve include axial cam members engaging each other to cooperate upon a rotation of the coupling sleeve for said axial displacement of the coupling sleeve between the release position and the coupling position so that the plug end portion of the plug member can be fitted into the socket hole of the socket member while the free end portion of the coupling sleeve inclusive of the locking nose is inserted through the coupling hole into the socket housing, and the locking nose is displaced towards and against the locking portion of the retainer wall of the socket housing upon and during a relative rotation of the plug device and the socket device. The ease of rotation of the plug device relative to the socket device, so that the locking noses are displaced to couple the socket device, provides a quick, easy and yet reliable connector system.

BRIEF DESCRIPTION OF DRAWINGS

The invention will be better understood with reference to the detailed description when considered in conjunction with the non-limiting examples and the accompanying drawings, in which:

FIG. 4A shows a perspective view of a framework of the connector system in FIG. 1 with one bar member in a release position and one bar member in the coupling position;

FIG. 4B shows a perspective view of the framework in FIG. 4A with both bar members in the coupling position;

FIG. 14 shows a front view of the embodiment in FIG. 2;

FIG. 15 shows a cross-sectional view of a release position of the embodiment in FIG. 14 across line G-G;

FIG. 16 shows a front view of the embodiment in FIG. 1;

FIG. 17 shows a cross-sectional view of a coupling position of the embodiment in FIG. 16;

DETAILED DESCRIPTION

Figure 1:
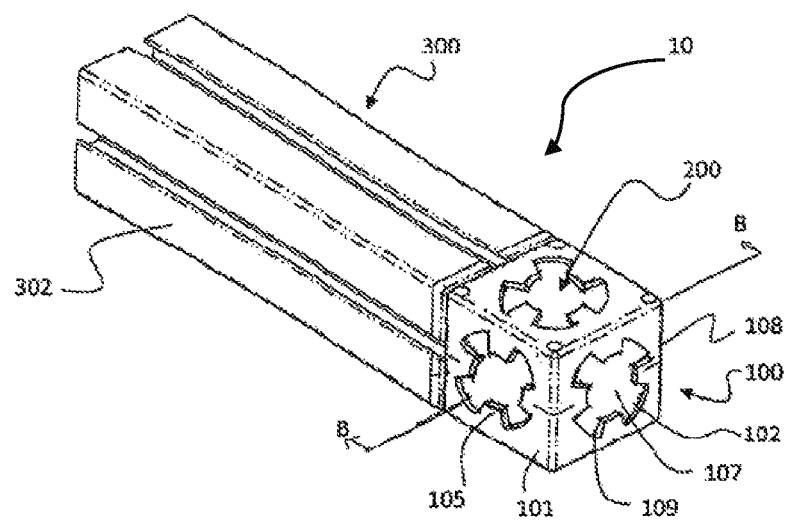
FIG. 1 shows a perspective view of an embodiment of a connector system.

The features described in an embodiment are not restricted to that embodiment and may be used in other embodiments FIGS. 1 to 4 show an embodiment of a bar member 300 and a connector system 10 provided to releasably couple the bar member 300 with up to five other bar members 300 to build a structural framework (not shown). The connector system 10 of this embodiment includes a plug device 200 (hidden in FIG. 1) in a hollow end portion of a bar member 300 which is of a hollow square cross-section and includes a socket device 100. The socket device 100 is provided to form a node point of the framework. Bar member 300 has an elongated body 302 having first and second hollow end portions wherein the plug device 200 is shown in FIGS. 1 to 4 to be axially and rotatably fixed in one of the hollow end portions of the bar member 300. A plug device 200 may also be fixed to each hollow end portions of the bar member (see FIG. 19). In FIG. 1, the embodiment shows the bar member 300 coupled to the socket device 100 in a coupling position. In the coupling position, an exposed plug end portion 220 (hidden) of a plug member 202 of the plug device 200 is inserted into the socket device 100 to couple the bar member 300 to the socket device 100 which will be explained later.

Figure 2:
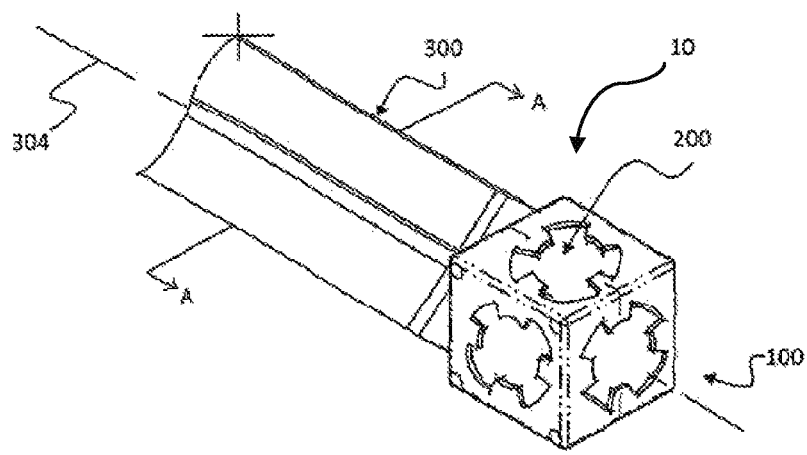
FIG. 2 shows a perspective view of the embodiment in FIG. 1 in a release position.
Figure 3:
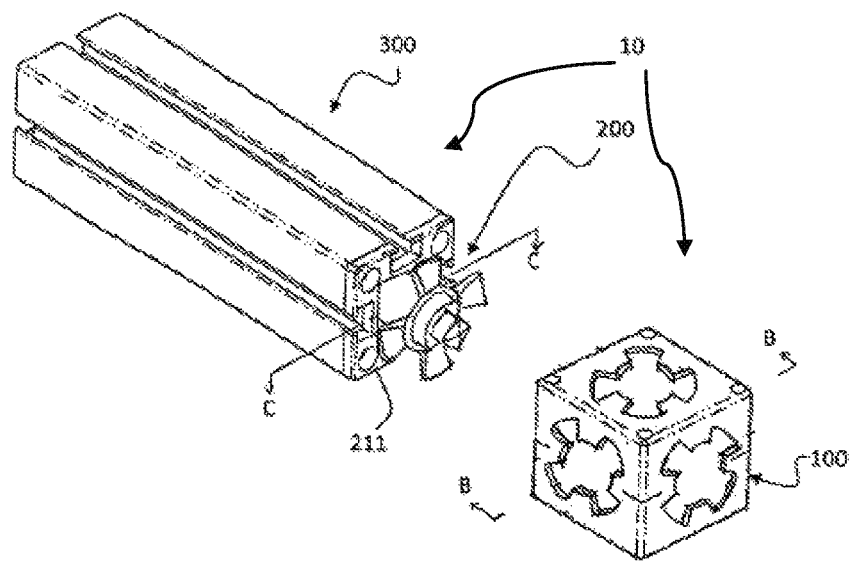
FIG. 3 shows a perspective view of the embodiment in FIG. 1 in a withdrawn arrangement.

FIG. 2 shows the connector system 10 in a release position and FIG. 3 shows the bar member 300 released from the socket device 100. In FIG. 2, the bar member 300 is rotated about 45 degrees about its longitudinal axis 304 from the position in FIG. 1. In the release position, the plug device 200 can be withdrawn from the socket device 100 as shown in FIG. 3.

Figure 4:
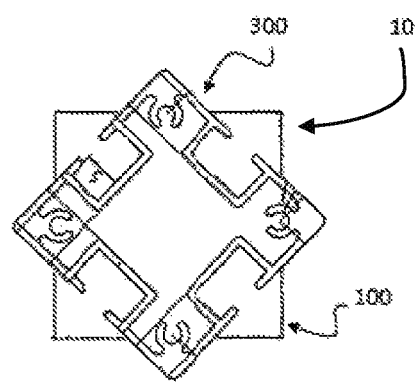
FIG. 4 shows a cross-sectional view of the embodiment in FIG. 2 along line A-A.

FIG. 4 shows a cross-sectional view of the connector system 10 in the release position from line A-A of FIG. 2. As shown in FIG. 4, the bar member 300 is rotated about 45 degrees from the coupling position of FIG. 1.

FIG. 4A shows an embodiment of the framework wherein the socket device 100 is a node point between two bar members 300 wherein the two bar members are coupled to the socket device 100 at right angle. One of the bar members 300, which is aligned with the socket device 100, is in a coupling position with respect to the socket device 100 and the other bar member 300, which is rotated 45 degrees about its longitudinal axis and with respect to the socket member (perpendicular to the other bar member 300) is in a release position with respect to the socket device 100.

FIG. 4B shows an embodiment of the framework in FIG. 4A wherein both the bar members 300, which are perpendicular to each other, are both aligned to the socket device 100 and are in the coupling position with respect to the socket device 100.

As shown in FIGS. 1 to 6, the socket device 100 has an outer socket housing 101 which may be of a cuboid profile having six faces. The socket device 100 may be of another shape that allows coupling of the bar member 300, e.g. a sphere having at least one substantially flat face for coupling. On at least one face, the socket device 100 has a coupling hole 102. The coupling hole 102 may be bordered by a retainer wall 108 of the outer socket housing 101. The coupling hole 102 in retainer wall 108 includes a circular centre portion 107 and at least one recess portion 109, two or three, each extending radially outwardly around the same centre portion 107 (see FIG. 7A). The recess portion 109 recesses at least the radial projection length of a locking nose (shown later) and the shape of the recess portion 109 preferably corresponds to the shape of the locking nose 206 in an axial view so that the locking nose 206 axially fits through the recess portion 109. In the present embodiment, there are four recess portions 109 spaced from each other in circumferential direction of the coupling sleeve 204 by 45 degrees and there are correspondingly four locking portions 105 of the retainer wall 108 radially projecting into the coupling hole 102 each circumferentially between two recess portions 109. In the present embodiment, the socket device 100 includes such a coupling hole 102 in each of its six faces to allow coupling of a plurality of bar members 300 to each of the faces.

Figure 5:
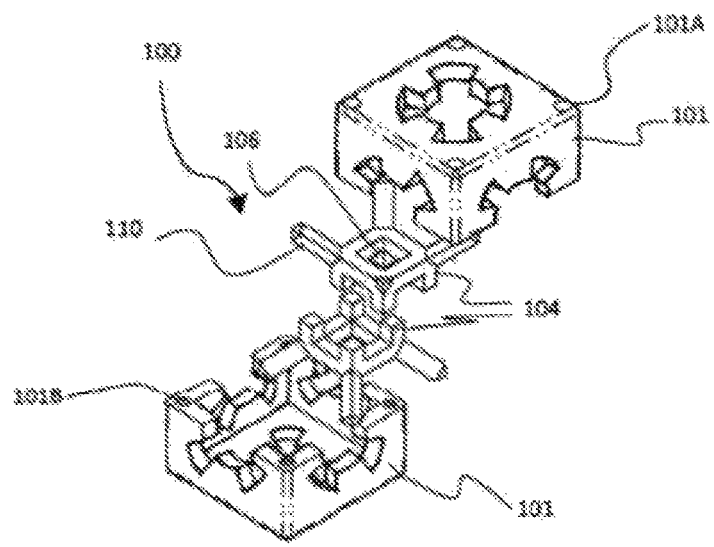
FIG. 5 shows an exploded view of the socket device in FIG. 1.

FIG. 5 shows an exploded view of the socket device 100. As shown in FIG. 5, the socket device 100 may include the outer socket housing 101 and a socket member 104 in the socket housing 101. The socket member 104 having a socket hole 106 of a non-circular cross-section which is adapted to receive the exposed plug end portion 220 (not shown in FIG. 5). The socket housing 101 and socket member 104 of FIG. 5 may be cubes (when the two halves join) having a plurality of corners, e.g. eight, and side walls, e.g. six. However, the socket housing 101 can have another shape e.g. sphere as long as it allows the receipt of the exposed plug end portion 220. The socket hole 106 is on at least one of the six faces of the socket member 104. FIG. 5 shows the socket member 104 having a socket hole 106 on each face of the socket member 104.

Figure 6:
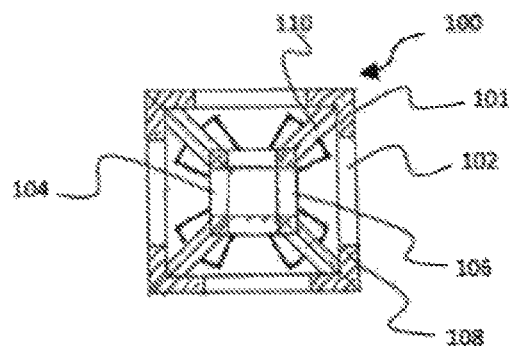
FIG. 6 shows a cross-sectional view of a socket device in FIG. 1 or 3 along line B-B.

As shown in FIGS. 5 and 6, the socket device 100 may be constructed by having joining two half housing 101 that are releasably interconnected together to enclose the socket member 104 within. The cuboid profile of the socket housing 101 may be split into halves at the centre of the cuboid socket housing 101. Each half of the socket housing 101 may have a complete face and four half faces perpendicular to the complete face interconnecting the edge of the complete face. The complete face has the coupling hole 102 and each half face has a half of the coupling hole 102. In this way, each half resembles a table top having four legs. When two halves are joined together at the legs, they may be interconnected by screws. The legs on one of the two halves may have a tubular hole 101A within each leg and the legs on the other half may have threaded holes 101B to engage a screw. When the halves are held together, screws may be inserted into the legs each having a tubular hole 101A and through the tubular hole 101A and screwed into the threaded holes 101B in the legs of the other half. Alternatively, they may be adhered together or snap-fitted together. As such, the semi-circular cut-out on each half face may be joined to another on the other half to form the coupling hole 102. Although the socket housing 101 may be split into halves in the present embodiment, it may be split along a plane off centre anywhere between the centre of the cube and a face of the cube.

Within the socket housing 101 is the socket member 104. The socket member 104 may also split along a plane across the centre of the member 104 into halves that are releasably interconnected to each other. Each half resembles a table having four legs. The socket member 104 has a square hole on the complete face and a rectangular cut-out on each half face such that each half resembles a table top having four legs mentioned above. To attach both halves of the socket member 104 together, screws may be used to join them together as described for the socket housing 101 above. Alternatively, the halves may be joined by adhesion or snap-fitting etc. In the present embodiment, the half socket members may be held together by connecting the half socket housings 101 together. Further, each half of the socket member 104 may have four supporting arms 110, each obliquely extending radially outward from a corner of the complete face in a radial direction outward from the centre of the socket device 100. The free end of each supporting arm 110 is preferably pointed in such a way that it has a shape of a tetrahedron which allows the supporting arm 110 to be rigidly held in an inner corner of the socket housing 101 when the socket member 104 is inserted into the socket housing 101 thus holding the socket member 104 via supporting arms 110. The supporting arms 110 may be made integral with the respective corners of the socket member 104. To assemble the socket device 100, the two halves of the socket member 104 are joined together and the socket member 104 and supporting arms 110 may be inserted into one half of the socket housing 101 whereby the socket member 104 may be rigidly mounted within the half socket housing 101 supported by the supporting arms 110. Subsequently, the other half of the socket housing 101 may be made to join the first half preferably by means of screws (not shown in FIG. 5), so that the socket member 104 be rigidly fixed within the socket housing 101 by the supporting arms 110.

FIG. 6 shows a cross-sectional view of the socket device 100 along line B-B in FIG. 1 or 3. As shown in FIG. 6, the socket hole 106 may be disposed in a distance behind the coupling hole 102 and aligned to the coupling hole 102. As described above, the socket member 104 preferably having a cuboid profile may be rigidly fixed within the socket housing 101 as may be held in position by supporting arms 110 having a tetrahedron shaped end rigidly held in a respective inner corner of the socket housing 101. The socket member 104 may have a non-circular socket hole 106 on each face and the socket housing 101 may have a "four leave clover" shaped hole on each face as shown in FIG. 6.

The socket member 104 may be supported by supporting arms 110 as described above. The supporting arms 110 extends from a corner of the socket member 104 to an inner corner of the socket device 100 nearest to the corner of the socket member 104 which the arm 110 extends from to leave a space between the socket member 104 and the retainer wall 108 of the socket housing 101. The oblique arrangement of the supporting arms 110 allows an unobstructed passage for the exposed plug end portion 220 (not shown in FIG. 6) of the plug member of plug device 200 to enter the socket device 100 to engage the socket hole 106. The retainer wall 108 allows locking noses 206 (not shown in FIG. 6) of a coupling sleeve 204 of the plug device 200 to engage against it when the locking noses 206 have been axially inserted through the coupling hole 102 of the socket housing 101 into the space between socket member 104 and socket housing 101 in the release position and are displaced by the plug member 202 of the plug device 200 as explained later (not shown in FIG. 6) toward the retainer wall 108 during the movement into the coupling position.

Figure 7:
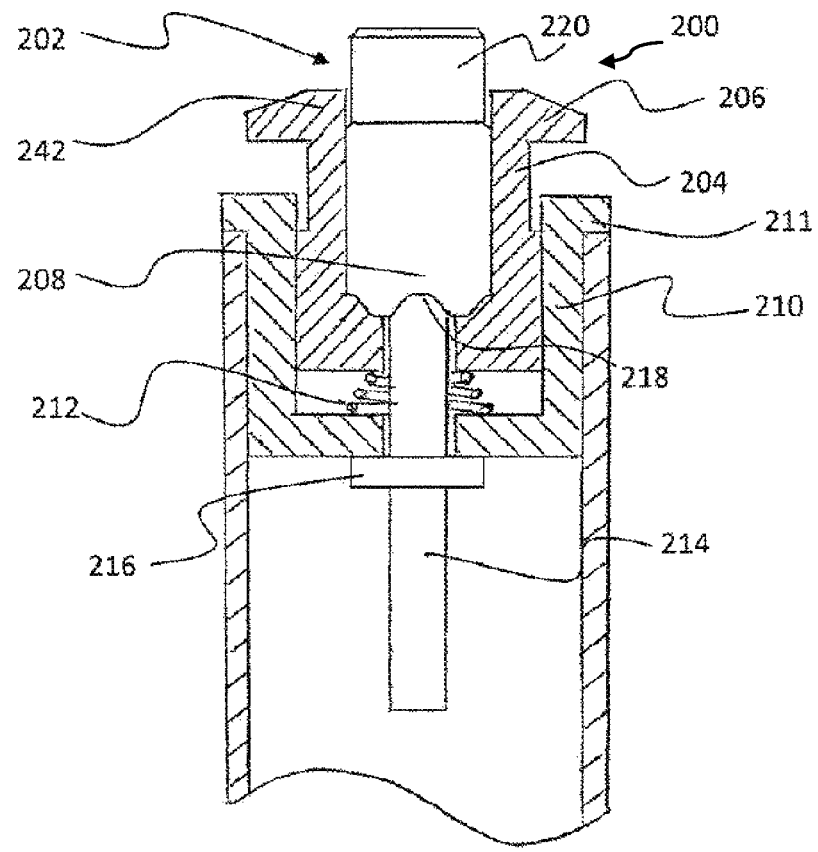
FIG. 7 shows a cross-sectional view of plug device along the line C-C in FIG. 3.

FIG. 7 shows a cross-sectional view of plug device 200 along the line C-C in FIG. 3. The plug device 200 includes a plug member 202 which includes a plug body 208 preferably of a cylindrical shape and a coupling sleeve 204 having an inner shape to slidably fit onto the plug member 202 to be rotatable and axially displaceable thereon. The plug member 202 also includes an exposed plug end portion 220 axially projecting out of a free end portion 242 of the coupling sleeve 204 and the exposed plug end portion 220 has a non-circular cross-section designed to fit into the socket hole 106 of the socket member 104 (not shown in FIG. 7). The coupling sleeve 204 is designed to be axially displaced relative to the plug member 202 between the release position and the coupling position while simultaneously rotating around plug body 208. When in the release position, the coupling sleeve 204 is axially nearer to the exposed plug end portion 220 than in the coupling position.

Figure 7A:
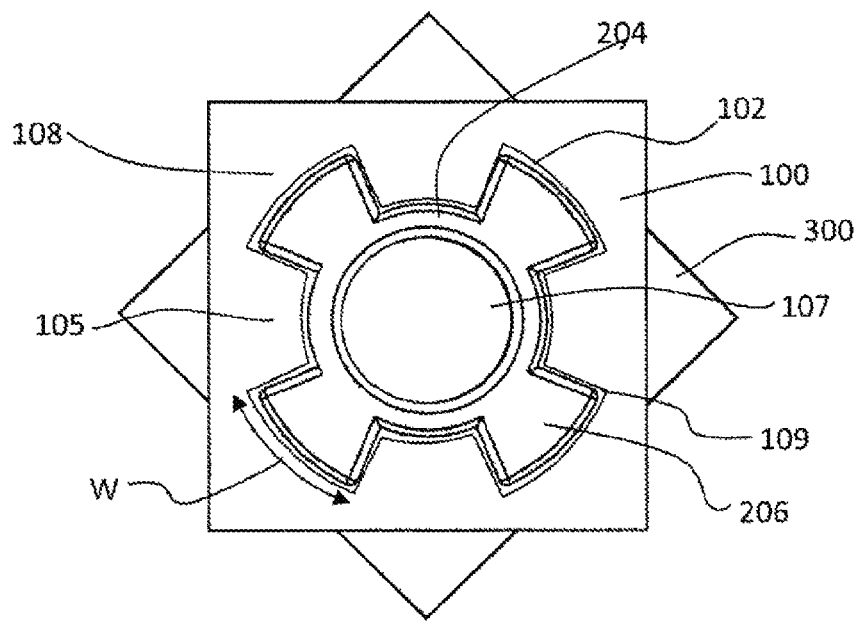
FIG. 7A shows an interface view of the embodiment in FIG. 1 between the socket device and bar member.

The free end portion 242 of the coupling sleeve 204 includes at least one radial locking nose 206 projecting outwardly on an outer peripheral surface of the free end portion 242 of the coupling sleeve 204. In FIG. 7A, although it is shown that there are four locking noses 206, it may be possible to have at least one locking nose 206, e.g. two or three. The locking nose 206 has a limited circumferential width W and preferably the width W is smaller than half the outer circumference of the coupling sleeve 204 so that the locking nose 206 may be inserted through the recess portion 109. Specifically, the circumferential width W of the locking nose is smaller than the outer circumferential length of coupling sleeve 204 divided by twice the number of locking noses 206.

As mentioned above and shown in FIG. 7A, the radial projection length of a locking nose 206 is at least the radial length of recess of the recess portion 109 and the shape of the locking nose 206 in an axial view preferably corresponds to the shape of the recess portion 109 so that the locking nose 206 axially fits through the recess portion 109. The axial height of the locking nose 206 from the free edge of the coupling sleeve 204 is smaller than the distance between the socket hole 106 and the coupling hole 102 (see FIG. 17). As shown in FIG. 7A, the centre portion 107 of the coupling hole 102 has a diameter that corresponds to the outer diameter of the coupling sleeve 204. Also, the outer radius of the recess portion 109 from the centre of the coupling hole 102 corresponds to the outer radius of the locking nose 206 from the longitudinal axis of the coupling sleeve 204. Further, the recess portion 109 has a width in a circumferential direction of the coupling hole 102 that corresponds at least to the circumferential width W of the locking nose 206 such that the recess portion 109 is bordered by the locking portion 105 of the retainer wall 108 in a circumferential direction of the coupling hole 102. In the present embodiment, the width of each recess portions 109 corresponds with the width of each of the locking nose 206. It can also be seen in FIG. 7A that the locking noses 206 are spaced from each other in circumferential direction of the coupling sleeve 204 and that the coupling hole 102 in the retainer wall 108 of the socket housing 101 includes a plurality of recess portions 109 that correspond to the plurality of locking noses 206. In this way, the plurality of recess portions 109 and locking noses 206 alternate each other around the centre portion 107 of the coupling hole 102.

As seen in FIG. 7, the plug device 200 further includes a frame member 210 and a pressure spring member 212. As shown in FIG. 7, the assembly of coupling sleeve 204 and the plug member 202 may be partially disposed in the frame member 210 and the plug device 200 may further include a pressure spring member 212 that is operatively connected axially between the frame member 210 and the coupling sleeve 204 and acts to push the coupling sleeve 204 toward the plug member 202 and therefore, towards the release position.

The pressure spring member 212 as shown in FIG. 7 is a conical helical spring. However, the profile of the pressure spring member 212 can be of another type e.g. cylindrical helical spring as long as it is able to bias the coupling sleeve 204 to the release position. One end (wider end) of the conical helical spring abuts the frame member 210 and the other end (narrower end) abuts the coupling sleeve 204.

The frame member 210 may be of a cup-shaped structure with an open upper end which allows the coupling sleeve 204 to be received within the frame member 210, wherein the free end portion 242 with the locking noses 206 projects out of the open end of the frame member 210. In the present embodiment, preferably, the coupling sleeve 204 has a square base portion 236 (shown in FIG. 11) and the frame member 210 has a corresponding hollow square profile therein which allows coupling sleeve 204 when inserted into frame member 210 to be fixed against rotation with the frame member 210 and yet free to move back and forth along a longitudinal axis 304 in the frame member 210. The frame member 210 can be inserted in the hollow end of the bar member 300 (as shown in FIG. 7) and has an outer profile, in this case a cup-shaped structure of square-shaped cross-section, that enables the frame member 210 to be located fittingly in the hollow end of the bar member 300 to be fixed against rotation in that hollow end that has in its turn a square-shaped cross-section in the embodiments shown in the drawings. Frame member 210 may have a plate-shaped outer flange 211 that may be screwed to the free end face of the bar member 300 as indicated in FIG. 3. Frame member 210 may further include an opening in its bottom wall which allows an extension rod 214 to be inserted through when the plug device 200 is assembled.

The plug device 200 may include the extension rod 214 which is fixed to and extends axially from plug body 208 and rotatable relative to the coupling sleeve 204. The extension rod 214 slidably extends through the pressure spring member 212 and the frame member 210 and is axially secured by a securing member 216 on the outside of the frame member 210. The securing member 216 is used for securing the plug member 202 from moving axially away from the frame member 210. In the present embodiment, the securing member 216 may be a nut and is tightened to the rod 214 by threads on the rod 214. The plug member 202 of the embodiments in the drawings is axially held in the frame member 210 of the plug device 200 against an axial movement or at most for a limited axial movement of the plug member 202. Extension rod 214 may be rotatable relative to frame member 210 to allow a certain rotational adjustment of plug end portion 220 of plug member 202 with respect to the socket hole 106 of socket member 104. The plug device 200 may be removably fitted into one of the hollow end portion of the bar member 300 by fasteners e.g. screws into a non-circular profile of the bar member 300, so that the plug device 200 is axially and rotatably fixed by the frame member 210 thereof to the bar member 300. The cup-shaped coupling sleeve 204 has a hollow cylindrical inner shape and is axially in contact with the plug member 202 at an interface 218 and is axially slidable and rotatable on cylindrical plug member 202 may be axially slidably received in the plug device 200 but it is fixed against rotation in the plug device 200. The interface 218 is formed by a cam member (shown in FIG. 8) on the plug member 202 and an opposing cam member (shown in FIG. 12) on the coupling sleeve 204. Due to the cam configuration, the coupling sleeve 204 can be axially displaced away from the plug member 202 axially along the longitudinal axis 304 when the coupling sleeve 204 is rotated relative to the plug member 202.

Figure 8:
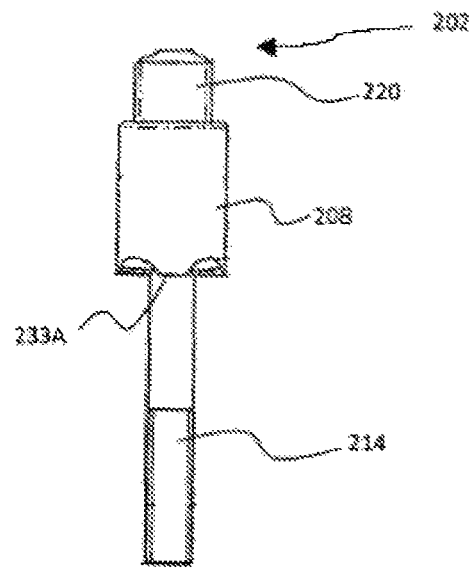
FIG. 8 shows a front view of a plug member of the embodiment in FIG. 7.

FIG. 8 shows a front view of the plug member 202. Plug member 202 is formed by the plug body 208 that includes an exposed plug end portion 220 having a non-circular cross-section that is complementary to the socket hole 106 of the socket member 104 (not shown in FIG. 8) to fit into the socket hole 106 (not shown in FIG. 8) and fix the rotation of the plug member 202 in the socket hole 106.

Figure 9:
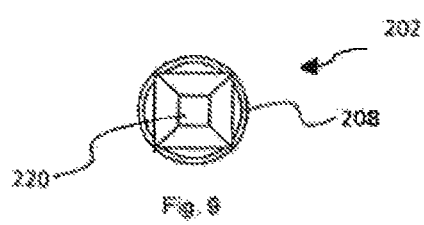
FIG. 9 shows a top view of the plug member in FIG. 8.
Figure 10:
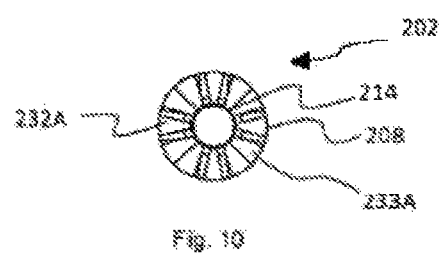
FIG. 10 shows an underside view of the plug member in FIG. 8.

In FIG. 9, it is shown that the exposed plug end portion 220 has a substantially squared profile. Although a substantially squared profile for the exposed plug end portion 220 is shown, another shape, e.g. hexagon or octagon, can be used as long as it is able to fix the rotation of the plug member 202 with respect to the socket device 100. The top portion of the plug end portion 220 is tapered to allow a guided insertion of the plug end portion 220 into the socket hole 106. The plug body 208 is of a cylindrical profile such that coupling sleeve 204 (not shown in FIG. 9) can be rotated around the plug body 208. The plug body 208 may have a diameter greater than the diagonal width of the plug end portion 220. The plug body 208 include the extension rod 214 that was already described with respect to FIG. 7, the rod may be of a cylindrical profile extended from plug body 208. FIG. 10 shows the underside of the plug body 208. It is shown that the rod 214 may be in a concentric arrangement with the plug body 208 and has a smaller diameter than the plug body 208. The plug member 202 includes a cam member 232A which meshes with an opposing cam member (not shown in FIG. 10) on the coupling sleeve 204. The cam member 232A is at an axial end face of plug body 208 and has a profile of a sinusoidal waveform that surrounds the rod 214. As shown in FIG. 8, at a trough of each of the sinusoidal waveform of the cam member 232A, a portion of the trough may be flattened to form a flat base 233A at the trough.

Figure 11:
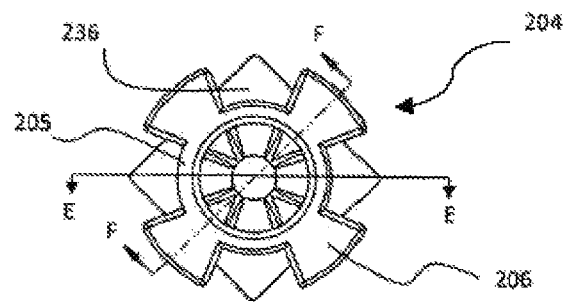
FIG. 11 shows a top view of the coupling sleeve in FIG. 7.

FIG. 11 shows a top view of the coupling sleeve 204. The coupling sleeve 204 may include a cylindrical sleeve portion 205 extending from a base portion 236 formed as a square. At a free end portion 242 of the cylindrical sleeve 205, the four axial locking noses 206 project radially outwardly on the free end portion 242 of coupling sleeve 204 and the locking noses 206 are spaced apart from each other around a circumferential direction along a peripheral surface of the free end portion 242.

Figure 12:
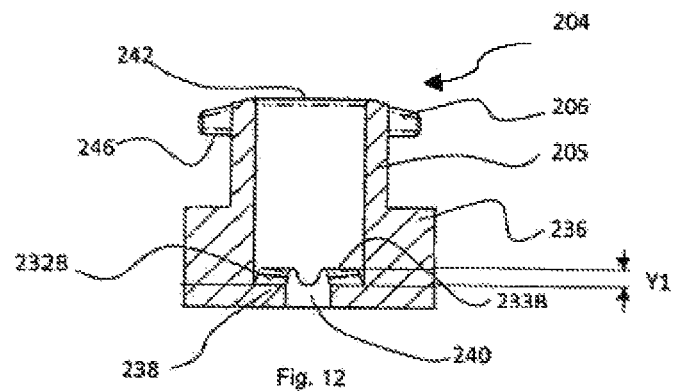
FIG. 12 shows a sectional elevation view E-E of the coupling sleeve in FIG. 11.
Figure 13:
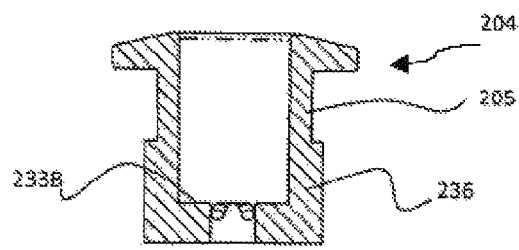
FIG. 13 shows a longitudinal cross-sectional view of coupling sleeve in FIG. 11 along line F-F.

FIG. 12 shows a cross-sectional view of the coupling sleeve 204 in FIG. 11 along line E-E and FIG. 13 shows a longitudinal sectional view of the coupling sleeve 204 in FIG. 11 along line F-F. As shown in FIG. 11, the coupling sleeve 204 includes a square base portion 236 such that the cylindrical sleeve portion 205 is extended from the base portion 236. The cylindrical hollow interior of coupling sleeve 204 may be extended into the base portion 236 to rotatably and axially slidably receive the bottom end portion of the plug body 208 (see FIG. 15). Coupling sleeve 204 provides a circular bottom wall 238 in the base portion 236. On the circular bottom wall 238, the opposing cam member 232B is formed to have a profile of a sinusoidal waveform or curve that meshes with the cam member 232A (not shown in FIG. 12) to form the interface 218. Cam member 232 may be formed on an insert (not shown) that is inserted into coupling sleeve 204 and fixed against rotation therein. At the interface, the cam member 232B on the bottom wall 238 of the coupling sleeve 204 faces towards the plug body 208, and cam member 232A at the end portion of plug body 208 faces towards the bottom wall of the coupling sleeve 204. As shown in FIG. 12, at the crest of each of the sinusoidal waveform of the opposing cam member 232B, a portion of the crest is flattened to hold the coupling sleeve 204 in the coupling position as will be explained in detail later. The cam member 232A and opposing cam member 232B shown in the drawings are collectively known to be axial cam members 232. The cam members 232A, 232B engages each other to alternately change the direction of the axial displacement of the coupling sleeve 204 upon a unidirectional rotation of the coupling sleeve 204. Similar to the cam member 232A, other profiles e.g. triangular waveform can be used as long as the coupling sleeve 204 can be displaced when the plug member 202 is rotated. The sinusoidal profile is used as it provides a smoother transition between the coupling position and the release position when the bar member 300 is rotated. Regardless the profile used, a flattened surface may be formed on respective top or bottom portion of the profile. The base portion 236 has a base hole 240 for the extension rod 214 to go through when in the assembled configuration.

As shown in FIG. 11, the coupling sleeve 204 may have four locking noses 206 each extending radially outwards from the free end portion 242 of the coupling sleeve 204. The locking noses 206 are spaced equally apart from each other, preferably, symmetrical with respect to rotation and corresponds to the radially outer shape, i.e. the recess portion 109, of the coupling hole 102 (not shown in FIG. 11) on the socket member 104. As shown in FIG. 12, each locking nose 206 may be tapered downwards away from an open end of the coupling sleeve 204 to allow easier insertion of the plug device 200 into the socket device 100. The edges of each locking nose 206 may be tapered for the same purpose. Each locking nose 206 includes an axial locking face 246 (see FIG. 12) facing away from the free end face of coupling sleeve 204 to engage on the locking portion 105 between the recess portions 109 in retainer wall 108 (see FIG. 17) of the socket device 100. The assembly of axial locking faces 246 are substantially a fan-shaped face when seen in an axial direction (FIG. 7A) and the axial locking faces 246 face away from the plug end portion 220 of the plug member 202 and are at least approximately in a radial plane perpendicular to the longitudinal axis of the plug member 202.

FIGS. 14-18 show the interaction between the cam member 232A and opposing cam member 232B at the interface 218. The coupling sleeve 204 is axially displaced relative to the plug member 202 between the release position and the coupling position when they are rotated relative to each other. The cam member 232A and the opposing cam member 232B have axially facing cam profiles that are arranged on a circle around the axis of relative rotation of plug member 202 and coupling sleeve 204, wherein each cam profile includes at least one trough and one crest that alternate with each other in the circular direction of the cam profile. As shown in FIGS. 15 and 17, the cam profiles may have a sinusoidal waveform with a plurality of crests and troughs. However, other profiles are possible as long as it allows the displacement of the coupling sleeve 204 during axial rotation thereof, e.g. triangular waveform.

Figure 18:
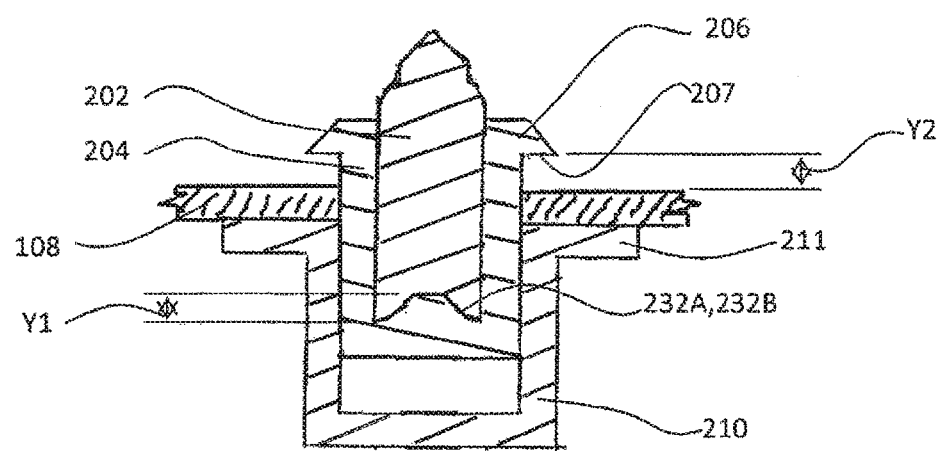
FIG. 18 shows an enlarged cross-sectional view of the plug device and a portion of the socket device in FIG. 17 just before engaging in the coupling position.

When the plug body 208 and the coupling sleeve 204 engages each other to cooperate upon a rotation of the coupling sleeve 204 between the release position and the coupling position, the locking noses 206 on the coupling sleeve 204 displace towards and against the relative locking portion 105 of the retainer wall 108 of the socket housing 101 upon the relative rotation of the plug device 200 and socket device 100. The axial distance of the locking nose 206 is smaller than the distance between the socket hole 106 and coupling hole 102 so that the locking nose 206 can be accommodated within the gap between the socket hole 106 and the coupling hole 102 and yet move towards the locking portion 105 by distance Y2 (FIG. 18) when going towards the coupling position. It can be seen between FIG. 17 and FIG. 18 that the position of the coupling sleeve 204 in the release position in FIG. 18 is nearer to the plug end portion 220 than when it is in the coupling position in FIG. 17 so that the locking noses 206 can move towards the locking portions 105 during the axial displacement of the coupling sleeve 204 from the plug body 208 caused by the cam members 232A and 232B.

Although cam member 232A is configured like an end cam in FIG. 15 that faces in the axial direction of the coupling sleeve 204, other configuration e.g. a cylindrical cam which has a cam profile around the cylinder can be used as long as coupling sleeve 204 is axially displaced relative to the plug member 202 in a predetermined manner in opposite direction upon a relative rotation of coupling sleeve 204 and plug member 202. The number of crests and troughs in the waveform determine the rotational angle required by the bar member 300 to be rotated to couple or release from the socket device 100 and are preferably equal to the number of locking noses 206 of coupling sleeve 204 and recess portions 109 of coupling hole 102. Preferably, the alternating crests and troughs of each cam profile are arranged symmetrically about the axis of relative rotation of coupling sleeve 204 and plug member 202 in a same manner as locking noses 206 and recess portions 109, so that the axial displacements of the coupling sleeve 204 between the release and the coupling positions are independent of the direction of that relative rotation of coupling sleeve 204 and plug member 202. A waveform having four crests and four troughs respectively allows independently of the rotation direction a 45 degrees rotation of the bar member 300 about the longitudinal axis 304 from the coupling position to the release position and vice versa. Similarly, a waveform having two crests and two troughs allows a 90 degrees rotation and a waveform having one crest and one trough allows a 180 degrees rotation.

In FIGS. 14 to 17, it is shown how the plug device 200 is attached to the socket device 100. Only the parts sufficient to illustrate the coupling of the socket device 100 and plug device 200 are shown. In FIG. 15, the plug device 200 engages the socket device 100 at about 45 degrees rotated about its longitudinal axis as compared to the socket device 100 (see FIG. 14) in a release position of coupling sleeve 204. In the release position, the plug end portion 220 is about to be inserted into socket member 104 as shown in FIG. 15, while the free end portion 242 of coupling sleeve 204 and the locking noses 206 are axially inserted through the coupling hole 102 of the socket housing 101. The axial cam member 232A and the opposing cam member 232B engage into each other (crests of cam member 232A engage into troughs of 232B) under the pressure of pressure spring member 212 (see FIG. 7). By engaging the socket device 100 at a 45 degrees out of phase release position (see FIG. 14), it can be seen by a user that the bar member 300 is in a release position. Consequently, having the bar member 300 to be in phase or aligned with the socket device 100 after the plug member 202 is inserted into socket hole 106 and the bar member 300 is rotated 45 degrees from the release position indicates (see FIG. 16) that the bar member 300 is coupled to the socket device 100. This allows the user to know whether the system has been fully assembled to prevent accidents.

Upon a relative rotation of the plug device 200 in any direction and the socket device 100, rotation occurs between the plug body 208 and the coupling sleeve 204 since the plug body 208 is held against rotation in the socket hole 106 of the socket device 100 and the coupling sleeve 204 is rotationally fixed to the frame member 210 Due to the cam members 232A and 232B, the rotation is translated into axial simultaneous displacement of the coupling sleeve 204 relative to the plug member 202 (from the release position into the coupling position). As such, the axial locking faces 246 of the locking noses 206 are axially displaced in a direction away from the plug end portion 220 of the plug member 202 upon and during a relative rotation of the coupling sleeve 204 and the plug member 202 and toward retainer wall 108 and the axial locking face 246 are simultaneously axially drawn towards and then against the locking portions 105 of the retainer wall 108 of the socket housing 101 thus coupling the bar member 300 to the socket device 100 as shown in FIG. 17. In this coupling position, the crests of 232A and the crests of 232B are aligned and in contact with each other as shown in FIG. 17 under the pressure of the spring member 212. Due to a flat profile of both the flat base 233A and flat top 233B, the profiles will not slide off from each other. In this way, both the plug member 202 and coupling sleeve 204 are reliably held in the coupling position.

Figure 20A:
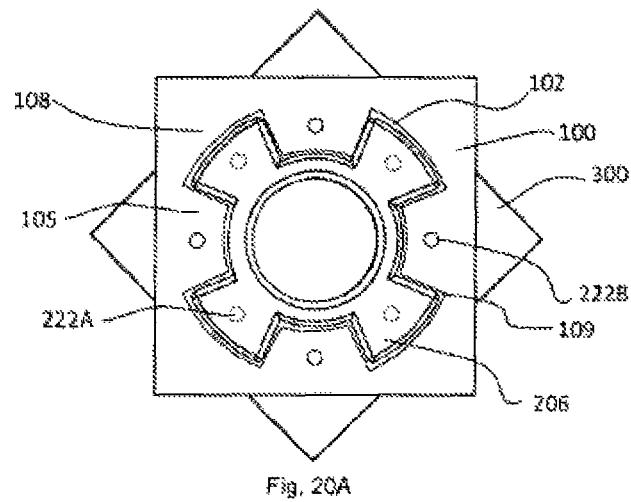
FIG. 20A shows an elevation view of the embodiment of FIG. 7A having releasably latching portions.
Figure 20B:
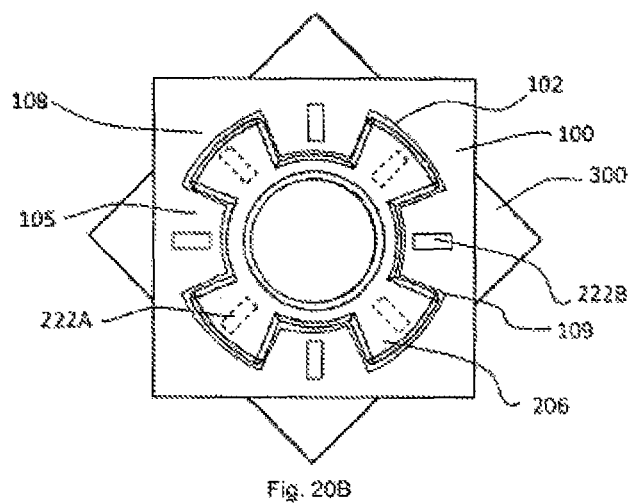
FIG. 20B shows an elevation view of the embodiment of FIG. 7A having another releasably latching portions.
Figure 20C:
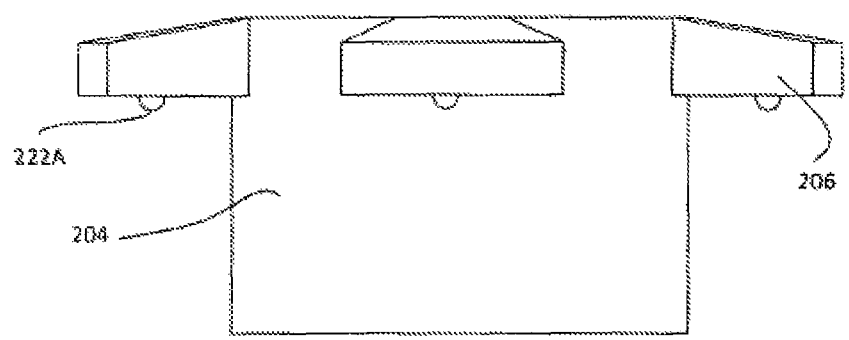
FIG. 20C shows a close up view of a coupling sleeve with the releasably latching portions in FIG. 20A.

Additionally or alternatively, the coupling position of coupling sleeve 204 as controlled by cam members 232A and 232B in a relative position in which the crests thereof are aligned and in contact with each other may be further defined by including a latching device of latching members that releasably engage each other in the coupling position. Such a latching device can be operatively provided, e.g., between the cam members 232A and 232B or between the coupling sleeve 204 and the plug member 202 or between the locking noses 206 and the locking portions 105. A preferable embodiment having releasably latching members 222 on the locking noses 206 and locking portions 105 is shown in FIG. 20A. As shown in FIG. 20A, the latching member 222 may include a projecting male member 222A, e.g. semi-spheres, on either the locking faces 246 of locking noses 206 or the locking portions 105 and an associated recessed female member 222B, e.g. an indentation, on the other of the locking faces 246 or locking portions 105. In FIG. 20A, the male members 222A are on the axial locking faces 246 of the locking noses 206, the male members 222A protruding in axial direction away from the plug end portion 220 of the plug member 202, and the female members 222B are recessed in the locking portions 105 of the retainer wall 108, facing the plug end portion 220 of the plug member 202. As mentioned above, as the axial locking faces 246 of the locking noses 206 are axially and rotational displaced in a direction towards the locking portion 105 of the retainer wall 108, the male member 222A coincides with and falls into the female member 222B, when the crests of 232A and the crests of 232B are aligned and in contact with each other. The snapping of the male member 222A and female member 222B may even provide a feedback to the user either from the sound generated and/or the small resistance against further rotating of the coupling sleeve 204 relative to the plug member 202. The latching members 222 may also be designed as pairs of radial ridges and radial grooves as shown in FIG. 20B, wherein the ridge may be on the locking face 246 of nose 206 to protrude in an axial direction away from the plug end portion 220 of the plug member 202, and the groove is recessed in the locking portions 105 to face in an axial direction toward the plug end portion 220 of the plug member 202, or vice versa. FIG. 20C shows an elevation view of the coupling sleeve 204 where the elevation view of the male members 222A of the releasably latching members 222 is shown.

Referring to FIG. 18, it can be shown that the axial distance Y2 travelled by the coupling sleeve 204 and therefore the distance travelled by the axial locking faces 246 of locking noses 206 is determined by the axial height Y1 of the cam members 232A and 232B between the a crest and a trough. Further, in the release position, when the free end portion 242 of the coupling sleeve 204 axially fits through the coupling hole 102 of the socket housing 101, the axial distance between the axial locking faces 246 of the locking noses 206 that face the locking portions 105 of the retainer wall 108 is denoted by Y2. Preferably, the height Y1 is marginally larger than the axial distance Y2 so that a force induced by "an interference fit" from the locking faces 246 of the locking noses 206 onto the locking portions 105 would prevent any disengagement of the locking noses 206 from the locking portions 105.

As shown in FIG. 7A, the shape of the free end portion 242 of coupling sleeve 204 inclusive of the locking noses 206 preferably complements the shape of the coupling hole 102. As shown in FIG. 17 when the locking noses 206 transits from the release position to the coupling position, the locking noses 206 are rotated about the longitudinal axis while being axially displaced, so as to be aligned onto the locking portions 105 of the retainer wall 108 to couple onto the retainer wall 108.

To release the bar member 300 from the socket device 100, the bar member 300 can be rotated again either in the clockwise or counter clockwise direction by rotating the bar member 300 again. By rotating the bar member 300, the cam members (cam member 232A and opposing cam member 232B) are rotated relatively to each other so that the flat top 233B of cam member 232B moves out of the flat base 233A of cam member 232A and under the force of spring member 212, the coupling sleeve 204 is displaced toward the plug member 202. As the coupling sleeve 204 is again displaced axially toward the plug member 202, the locking noses 206 return to its release position as shown in FIG. 18.

Besides the present described embodiment and some of the alternatives mentioned, there are other arrangement that can be contemplated without deviating from the concept of the present invention.

Figure 19:
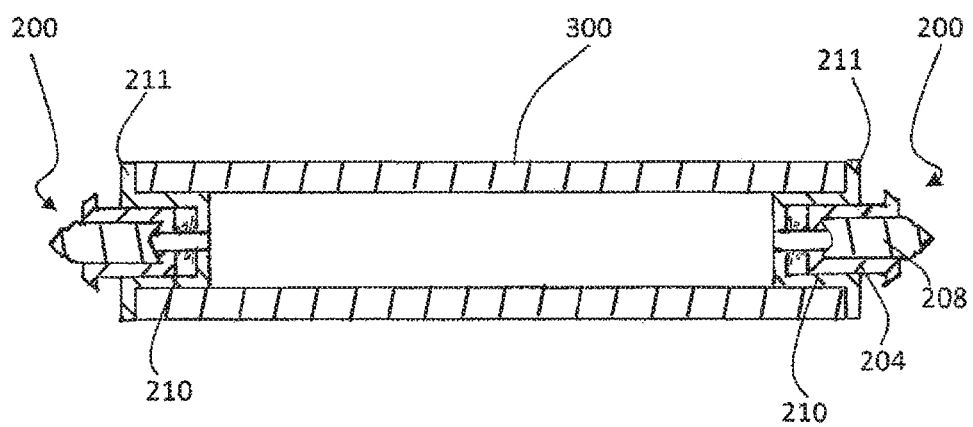
FIG. 19 shows an embodiment of FIG. 1 having a plug device at each end of the bar member.

For example, in FIG. 19, the bar member 300 can have a plug device 200 at each of the two end portions of the bar member 300. The plug device 200 may be a first plug device at the first hollow end portion and a second plug device that is identical to the first plug device can be inserted in a second hollow end portion of the bar member 300 in an axially and rotatably fixed condition such that the cam members of the plug devices are aligned to each other in a synchronized condition so that the coupling sleeves 204 of both plug devices 200 are in their release positions. The plug end portions 220 of the plug members 202 of each of the two plug devices 200 are inserted into the socket hole 106 of a respective socket device 100 (that is held stationary, e.g., since coupled to other bar members 300, respectively), while the free end portions 242 of the coupling sleeves 204 are inserted through the coupling holes 102 of the respective socket devices 100. The bar member 300 is then rotated from a first rotation position, e.g. the release position, into a second rotation position, e.g. the coupling position, so that the coupling sleeves 204 of both plug devices 200, that have their plug end portions 220 held fixed against rotation in the socket devices 100, are simultaneously rotated and axially displaced into the respective coupling positions to engage the retainer wall 108 of each of the socket devices 100. Since the cam profiles of the cooperating cam members 232A and 232B are effective to rotate the coupling sleeves 204 of both plug devices 200 independently of the rotation direction into the coupling positions, the coupling sleeves 204 of both plug devices 200 reach their coupling positions by a same unidirectional rotation of the bar member 300, though the rotation directions of relative rotation of the coupling sleeves 204 around the associated plug members 202 are opposite to each other.

In another embodiment, the socket device 100 can be designed to be attached or built into an end portion of bar member 300 to allow direct attachment between bar members 300 e.g. to extend bars. In this embodiment, the socket device may include only one non-circular socket hole that is located in a distance behind the coupling hole. In this way, the plug device 200 of another bar member 300 may be inserted into the coupling hole of the bar member and engaging the plug end portion 220 with the socket hole to connect two bar members 300 together.

The invention claimed is:

1. A connector system of a structural framework, the system comprising a socket device and a plug device that can be coupled to the socket device, the socket device including an outer socket housing and a socket member in the socket housing, the socket housing having a coupling hole bordered by a retainer wall, and the socket member having a socket hole of non-circular cross-section, the socket hole disposed in a distance behind the coupling hole, the plug device comprising a plug member and a coupling sleeve, the plug member including a plug body that is cylindrical slidably inserted into the coupling sleeve and that includes an exposed plug end portion axially projecting out of a free end portion of the coupling sleeve and having a non-circular cross-section designed to fit into the socket hole of the socket member, the free end portion including at least one radial locking nose radially projecting outwardly on an outer peripheral surface of the free end portion of the coupling sleeve and having a limited circumferential width equal to or smaller than a half of the circumferential length of the outer peripheral surface of the free end portion, the coupling sleeve designed to be axially displaceable relative to the plug member between a release position and a coupling position, wherein the free end portion of the coupling sleeve inclusive of the locking nose axially fits through the coupling hole of the socket housing when the coupling sleeve is in the release position, and the retainer wall includes a locking portion radially projecting by the radial projecting length of the locking nose into the coupling hole, and wherein the plug body and the coupling sleeve include axial cam members engaging each other to cooperate upon a rotation of the coupling sleeve for said axial displacement of the coupling sleeve between the release position and the coupling position so that the plug end portion of the plug member can be fitted into the socket hole of the socket member while the free end portion of the coupling sleeve inclusive of the locking nose is inserted through the coupling hole into the socket housing, and the locking nose is displaced towards and against the locking portion of the retainer wall of the socket housing upon and during a relative rotation of the plug device and the socket device.

2. The system as claimed in claim 1, wherein the plug device further includes a pressure spring member that is operatively connected axially between the plug body and the coupling sleeve.

3. The system as claimed in claim 2, wherein the spring member is a conical spring member that is supported on the underside of the bottom wall of the coupling sleeve.

4. The system as claimed in claim 1, wherein the coupling hole is formed in the retainer wall of the socket device to include a circular center portion and at least one recess portion radially outwardly of the center portion, the center portion having a diameter that corresponds to an outer diameter of the coupling sleeve, and the recess portion having a width in a circumferential direction of the coupling hole that corresponds at least to the circumferential width of the locking nose, the recess portion having a radial length of at least equal to the radial projection length of the locking nose and an axial shape corresponding to axial shape of nose in axial view, so that the locking nose axially fits through the recess portion, wherein the recess portion is bordered by the locking portion of the retainer wall in a circumferential direction of the coupling hole.

5. The system as claimed in claim 4, wherein the free end portion of the coupling sleeve includes a plurality of locking noses that are spaced from each other in circumferential direction of the coupling sleeve, wherein the coupling hole in the retainer wall of the socket housing includes a plurality of recess portions that correspond to the plurality of locking noses of the coupling sleeve, so that the plurality of recess portions and locking portions of the retainer wall alternate each other around the center portion of the coupling hole.

6. The system as claimed in claim 4, wherein each of the recess portions have a width that corresponds to the width (W) of each of the locking noses.

7. The system as claimed in claim 1, wherein the locking noses have axial locking faces that face away from the plug end portion of the plug member and are at least approximately in a radial plane of the plug member or the coupling sleeve, the locking faces are axially displaced in a direction away from said plug end portion of the plug member upon and during a relative rotation of the coupling sleeve and the plug member from the release position into the coupling position to axially move in a direction toward the retainer wall of the socket housing when the free end portion of the coupling sleeve has been inserted through the coupling hole into the socket housing.

8. The system as claimed in claim 1, wherein the cam members are end cams having axially facing cam profiles that face each other are arranged in a circle around the axis of relative rotation of coupling sleeve and plug member and each include at least one trough and at least one crest that alternate along the circle to axially engage each other and alternately change the direction of said axial displacement of the coupling sleeve upon a unidirectional rotation of the coupling sleeve.

9. The system as claimed in claim 8, wherein the crest of at least one of the cam members is flattened to hold the coupling sleeve in the coupling position.

10. The system as claimed in claim 1, wherein the coupling sleeve includes a bottom wall and the cam members are disposed between the bottom wall and an axial face of the plug body.

11. The system as claimed in claim 10, wherein the cam profiles are of a sinusoidal waveform having at least one crest and at least one trough.

12. The system as claimed in claim 11, wherein the cam profile has four crests and four troughs.

13. The system as claimed in claim 11, wherein the cam profile has two crests and two troughs.

14. The system as claimed in claim 1, wherein the socket member is held within the socket housing by supporting arms to leave a space between the socket member and the retainer wall, wherein each supporting arm is connected on a corner of the socket housing and to a corner of the socket housing.

15. The system as claimed in claim 1, wherein the socket housing is a cube having a plurality of corners and side walls, and the socket member is a hollow cube having a plurality of corners and side walls, wherein each of a plurality of the side walls of the socket housing includes the retainer wall and includes a coupling hole in the retainer wall for receiving the free end portion of the coupling sleeve in the release position thereof, and each of a plurality of sides of the socket member includes a socket hole for receiving the plug end portion of the plug member.

16. The system as claimed in claim 15, wherein the socket member is held within the socket housing by supporting arms to leave a space between the socket member and the retainer wall, wherein each supporting arm is connected on a corner of the socket member and to a corner of the socket housing, and wherein each of the socket housing and the socket member includes two halves that are releasably interconnected, and wherein the supporting arms are integrally formed on the corners of the socket member halves.

17. The system as claimed in claim 1, wherein the plug body includes an axial extension rod that is rotatably received in the plug device and rotatable relative to the coupling sleeve.

18. The system as claimed in claim 1, wherein the plug device is inserted into a hollow end portion of a bar member in an axially and rotatably fixed condition.

19. The system as claimed in claim 18, wherein the plug device is a first plug device and a second plug device that is identical to the first plug device is inserted in a second hollow end portion of the bar member in an axially and rotatably fixed condition, wherein the cam members of the plug devices are aligned to each other in a synchronized condition such, that the coupling sleeves of both plug devices are in the release position, when the bar member is in a first rotation position, and both plug devices enter the coupling position when the bar member is rotated from the first rotation position into a second rotation position.

20. The system as claimed in claim 1 further comprising releasably cooperating latching members including a male member on one of the locking nose and the locking wall portion and a female member on the other of the locking nose or locking wall portion, cooperating to engage into each other when the coupling sleeve is in the coupling position.

* * * * *